(12) United States Patent
Gupta et al.

(10) Patent No.: US 6,738,081 B2
(45) Date of Patent: May 18, 2004

(54) DISPLAY FOR A GRAPHICAL USER INTERFACE

(75) Inventors: Ashok Gupta, Brighton (GB); Judith F. M. Masthoff, Brighton (GB); Paul Zwart, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 495 days.

(21) Appl. No.: 09/746,076

(22) Filed: Dec. 22, 2000

(65) Prior Publication Data

US 2001/0024200 A1 Sep. 27, 2001

(30) Foreign Application Priority Data

Dec. 24, 1999 (GB) ............................................. 9930852

(51) Int. Cl.[7] .............................................. G06F 13/00
(52) U.S. Cl. ...................................... 345/767; 345/768
(58) Field of Search ................................ 345/767, 765, 345/788, 790–794, 821–824, 771–773, 766, 719–728, 433, 431, 523, 678, 677, 768; 382/175

(56) References Cited

U.S. PATENT DOCUMENTS 5,977,977 A * 11/1999 Kajiya et al. ................ 345/418
6,292,596 B1 * 9/2001 Snyder et al. ............... 382/319
6,300,955 B1 * 10/2001 Zamir ......................... 345/433
6,511,426 B1 * 1/2003 Hossack et al. ............. 600/437

FOREIGN PATENT DOCUMENTS

EP          0523771 A1      1/1993

* cited by examiner

*Primary Examiner*—Steven Sax
(74) *Attorney, Agent, or Firm*—John Vodopia

(57) ABSTRACT

A method of providing a display (10) for a graphical user interface in which a user may define a selected region (20) of a subject image (3) is disclosed together with a computer program, a computer-readable storage medium (72) and apparatus for the same (71). The method comprising the steps of displaying the subject image (3); displaying at least one mask (12, 13, 14, 15) over the subject image wherein at least part of the or each mask extends to the periphery of the subject image (11); and defining the selected region (20) as those parts of the subject image not covered by a mask. The or each mask has a geometry which may vary in accordance with a user's input whereby the user selecting a first point within a mask and a second point displaced therefrom causes the geometry of that mask to vary in relation to the displacement (16, 17, 18, 19, 21) between the first and second points.

9 Claims, 3 Drawing Sheets

DISPLAY FOR A GRAPHICAL USER INTERFACE

BACKGROUND OF THE INVENTION

This invention relates to a method of providing a display for a graphical user interface (GUI) and to a computer program, a computer-readable storage medium and apparatus for the same. In particular, the invention relates to providing a display for a graphical user interface in which a user may define a selected region of a subject image displayed in the display.

The requirement to select a region of a given subject image in a display is well known and arises in many applications. One such example is in the field of radiology in which a radiographer may be required to focus in on or select diagnostically relevant image parts within an overall radiographic image. In this field, the requirement to be able to select an area of interest quickly and accurately is particularly important because of the scarcity of the skilled human resource, i.e. the radiographer's time. Four methods of achieving this are described at line 31 of column 8 to line 8 of column 9 of EP-A1-0523771.

The first method described requires a user to draw a contour by moving a light mark in the display under visual control, say using a co-ordinate pen or mouse, and the selected region of interest is defined as all image points contained in the contour. In the second method, the region of interest is defined as all the image points enveloped by a rectangle, itself defined by the user selecting upper left and bottom right corners. Similarly, in the third and fourth methods described, the regions of interest are defined as all the image points enveloped by a circle defined by its centre and a radial point, and a polygon defined by its corners respectively.

It is further known to manipulate the profile of a region already selected. One such method of manipulation is illustrated in FIG. 1 in which a display 1 is shown having a window 2 which frames a subject image 3. The selected region is rectangular, say selected using the second method described in EP-A1-0523771, and denoted by markers 5, four positioned at each corner and four at the midpoint of each side. The markers may be moved using a drag-and-drop technique and the shape of the selected region manipulated accordingly. This method is well known and implemented in commercial image processing packages such as Microsoft™ Photo Editor 3.0.

However, in the field of radiography and indeed many other fields with GUI applications requiring quick and accurate part image selection, there is a continual need to increase productivity and one way this may be achieved is to provide an enhanced selecting method. It is therefore an object of the invention to provide a method for providing a display for a graphical user interface in which a user may select a region of a subject image more quickly and efficiently.

SUMMARY OF THE INVENTION

According to the present invention, a method comprises the steps of displaying the subject image; displaying at least one mask over the subject image wherein at least part of the or each mask extends to the periphery of the subject image; and defining the selected region as those parts of the subject image not covered by a mask, preferably where the outer periphery of at least one mask defines at least part of the profile of the selected region, wherein the or each mask has a geometry which may vary in accordance with a user's input whereby the user selecting a first point within a mask and a second point displaced therefrom causes the geometry of that mask to vary in relation to the displacement between the first and second points.

Such a method provides a quick and efficient method of selection and especially where the function to move a mask is not pre-selected but initiated upon selection of the first point within the mask. Also, with at least part of the or each mask having a variable geometry and extending to the periphery of the subject image, they may be "stored" at the periphery of the subject image thereby not interfering with viewing the subject image when not in use.

In addition, manipulating a selected region may be achieved by selecting a point anywhere within a corresponding mask, thereby accommodating a degree of inaccuracy with respect to point selection. Conversely, in the conventional arrangement shown in FIG. 1, discrete points defining the profile of the selected region have to be selected. Of course, it is known to highlight an enlarged area immediately adjacent to such discrete points as shown by feature 5 of FIG. 1, and thereby enable selection of a discrete point by selection of a point anywhere within the enlarged area. As such, it will be understood that the present invention is not intended to cover this arrangement.

In order to further simplify selection, when a user selects a first point within overlapping masks and a second point displaced therefrom, the geometry of the overlapping masks may be made to vary simultaneously, thereby reducing the number of instructions for varying the geometry of overlapping masks as would be needed if they were varied individually.

Given that subject images are typically rectangular, it is convenient that the or each mask may be is associated with a single side of the subject image whereby the geometry of the or each mask may only vary in a direction perpendicular to its associated side of the subject image. In such an arrangement, it is preferable that four masks are displayed, each associated with different sides of the subject image.

Conveniently, the first and second points are selected using a drag and drop technique thereby enabling the geometry of a mask to be varied in one single movement, for example, by one stroke of a screen pen on a touch sensitive screen or by one mouse movement.

BRIEF DESCRIPTION OF THE DRAWINGS

Embodiments of the present invention will now be described, by way of example only, with reference to the accompanying figures in which:

DESCRIPTION OF THE PREFERRED EMBODIMENTS

Figure 1:
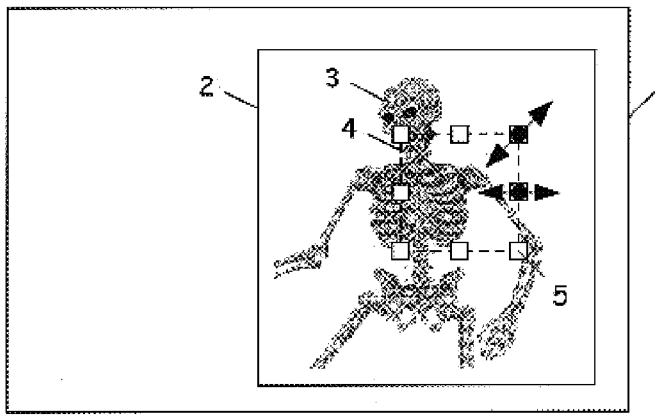
Figure 5:
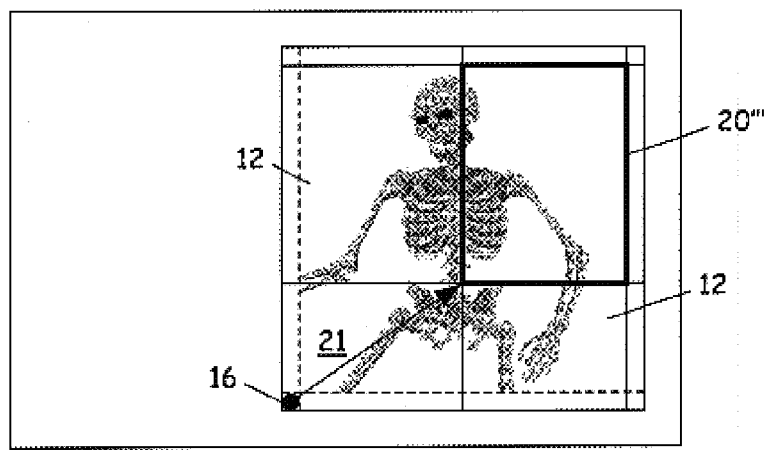
Figure 6:
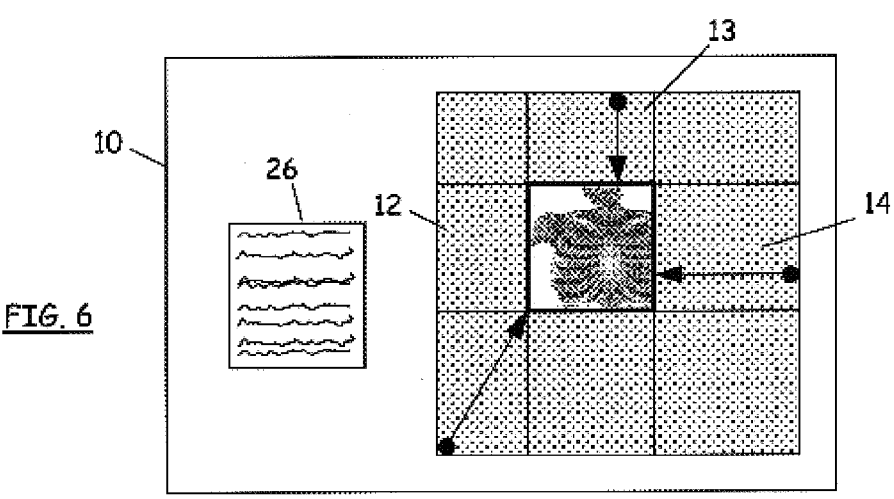
Figure 7:
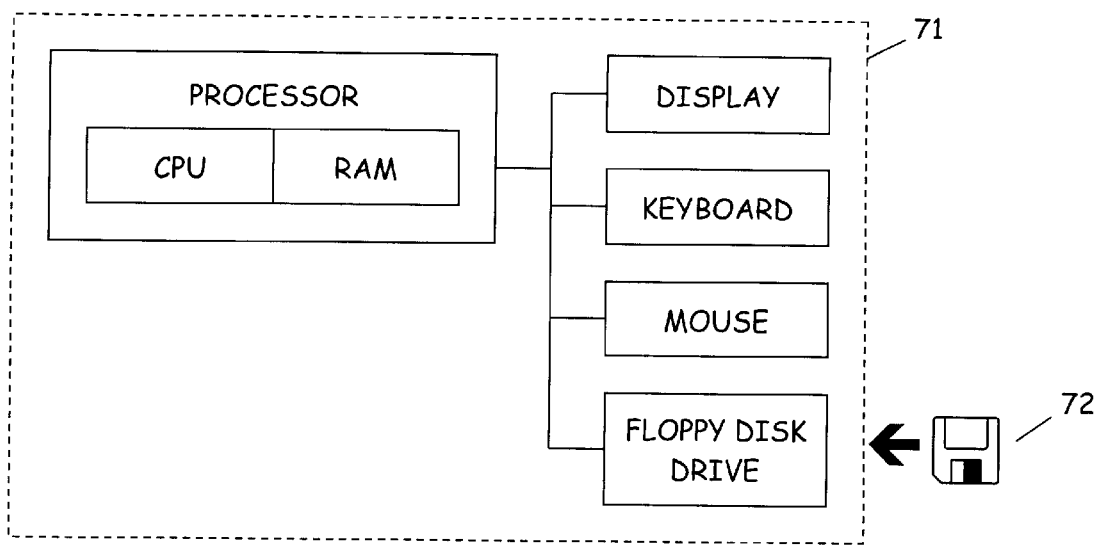

FIG. 1 illustrates a conventional method of providing a display in which a pre-selected region of an image may be manipulated, as herebefore described;

FIGS. 2 to 6 illustrate methods for providing a display according to the present invention; and FIG. 7 shows, schematically, a computer system capable of implementing the methods illustrated in FIGS. 2 to 6.

Figure 2:
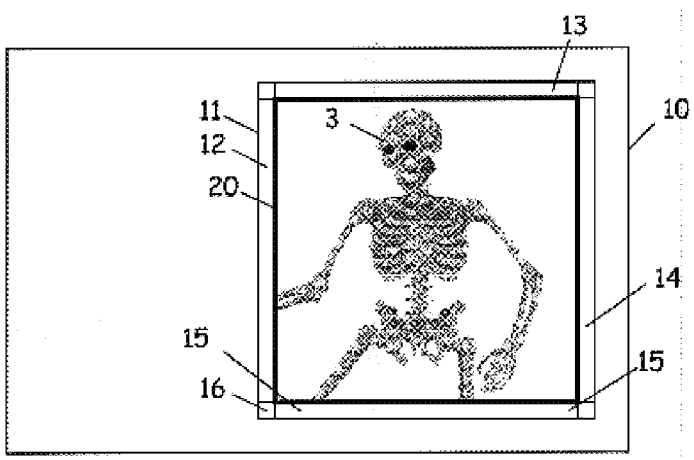

Referring to FIG. 2, a touch sensitive display 10 of conventional type is shown, operated by a method in accordance with the present invention. In the display, a window 11 is provided in which is framed a subject image 3. Four rectangular masks 12, 13, 14, 15 of variable geometry are provided, bordering the window, with each pair of adjacent horizontal 13, 15 and vertical 12, 14 masks overlapping. For example, the left, vertical mask 12 overlaps the lower horizontal mask 15 in an overlapping region 16 in the lower left hand corner of the window. Each mask 12, 13, 14, 15 is shown having a wire frame with a transparent body and the outer periphery of the fours masks collectively define a selected region 20 denoted with a thickened outline.

Figure 3:
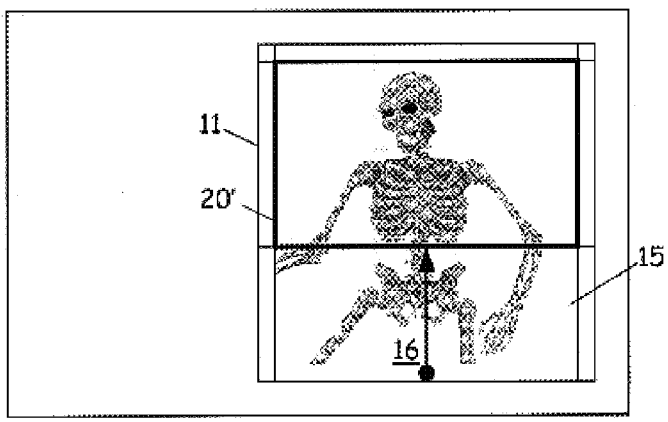

FIG. 3 illustrates manipulation of the lower horizontal mask 15. Using a display pointer (not shown) under the control of a user and a drag-and-drop technique, the masking region 15 is dragged upwards as denoted by the arrow 16. The drag-and-drop technique comprises selecting a first point within the lower horizontal mask 15 by touching the display with the pointer, dragging the pointer upwards and in continual contact with the screen, and then removing the pointer from contact with the screen so as to define a second point, vertically displaced from the first point.

The geometry of the lower horizontal mask is changed whereby the upper side of the mask 15 is moved upwards by an amount corresponding to the vertical displacement between the first point and the second point, whereas the lower side of the lower horizontal mask remains at the periphery of the window 11. The consequence of this is to increase the area covered by the lower horizontal mask and correspondingly reduce the area of the selected region 20'. The changes in mask geometry may be shown in the display after the second point is selected or, alternatively, continually during the dragging motion of the display pointer.

Figure 4:
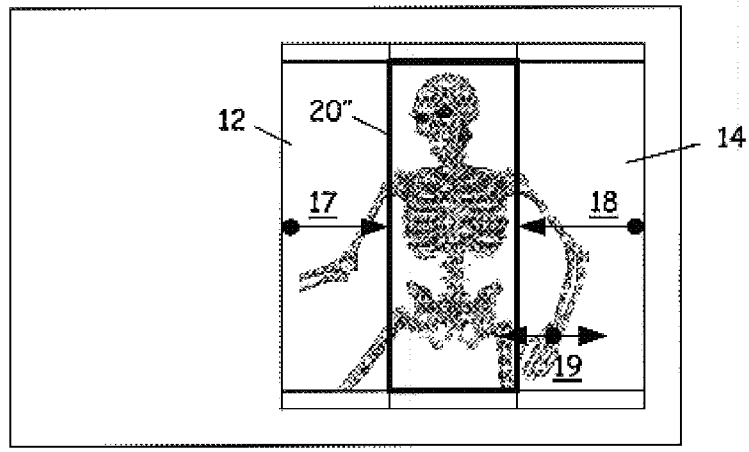

Both the left and right vertical masks 12, 14 can also be manipulated in a similar way by respective drag-and-drop actions 17, 18 as illustrated in FIG. 4. Also, once first dragged roughly into position, the geometry of a mask may be further varied so as to "fine tune" the position of the masks as illustrated by arrow 19 using a further drag-and-drop instruction or using cursor keys. By manipulating both vertical masking regions the selected region 20" results as shown.

In FIG. 5 simultaneous manipulation of the left vertical masking bar 12 and the lower horizontal masking bar 15 is illustrated. They are moved simultaneously by selecting a first point in an initial overlapping region 16 of the left vertical and lower horizontal masking regions, and a second point selected displaced from the first point as denoted by the arrow 21. Using this method the selected region 20" is defined using one drag and drop movement, and in which both vertical and horizontal aspects of the selected region are changed.

FIG. 6 shows a combination of the aforementioned techniques in which the upper horizontal masking region 13 and the right vertical masking region 14 are manipulated using single drag and drop techniques and the left vertical masking region 12 and a lower horizontal masking region 15 are manipulated simultaneously using a drag and drop technique from an overlapping region. In the display of FIG. 6, the masking regions are shown as opaque although of course, any other conventional method of distinguishing between the selected and unselected regions of an image may be used.

In addition, a text window 26 is displayed in the display 10 and may convey associated information such as characteristics or the identity of the subject image. For example, in the field of radiography this may include extracts of medical records.

A computer system 71 capable of implementing the above method is shown schematically in FIG. 7. The computer system comprises a processor having a central processing unit (CPU) and a random access memory (RAM). The computer system further comprises a display, keyboard, mouse and a floppy disk drive, all coupled to the processor in known manner. A floppy disk 72 is provided for the floppy disk drive having recorded thereon a computer program comprising instructions for performing a method according to the present invention. Alternatively, other types of computer-readable storage media and corresponding hardware may be used.

Implementation of a method according to the present invention in such a computer system may be readily accomplished in hardware, in software by appropriate computer programming and configuration or through a combination of both. Of course, such programming and configuration is well known and would be accomplished by one of ordinary skill in the art without undue burden. It would further understood by one of ordinary skill in the art that the teaching of the present invention applies equally to other types of apparatus having a GUI and not only to the aforementioned computer system.

What is claimed is:

1. A method of providing a display for a graphical user interface in which a user may define a selected region of a subject image, the method reducing the complexity in defining the selected region of the subject image, the method comprising the steps of:

displaying the subject image;

displaying at least one mask over the subject image wherein at least a part of the at least one mask extends to the periphery at the subject image; and defining the selected region as those parts of the subject image not covered by the at least one mask, wherein the at least one mask has a geometry which may vary in accordance with a user's input whereby the user selecting a first focus point within the at least one mask and a second focus point displaced therefrom causes the geometrical layout and area of the mask to vary in relation to the vectorial displacement between the first and second focus points.

2. A method according to claim 1 wherein an outer periphery of the at least one mask defines at least part of a profile of the selected region.

3. A method according to claim 1 wherein a user selecting the first focus point within overlapping masks and a second focus point displaced therefrom causes the geometry of the overlapping masks to vary simultaneously.

4. A method according to claim 1 wherein the subject image is rectangular, and wherein the at least one mask is associated with a single side of the subject image whereby the geometry of the at least one mask varies only in a direction perpendicular to its associated side of the subject image.

5. A method according to claim 4 wherein four masks are displayed, each associated with a different side of the subject image.

6. A method according to claim 1 wherein the first and second focus points are selected using a drag and drop technique.

7. A computer program comprising instructions for performing the method according to claim 1.

8. A computer-readable storage medium having recorded thereon a computer program according to claim 7.

9. Apparatus having a display, a processor and a user input device wherein the processor is programmed to carry out the method according to claim 1.

* * * * *